(No Model.)
J. PERKINS.
FLOWER HOLDER AND STAND.
No. 265,700. Patented Oct. 10, 1882.
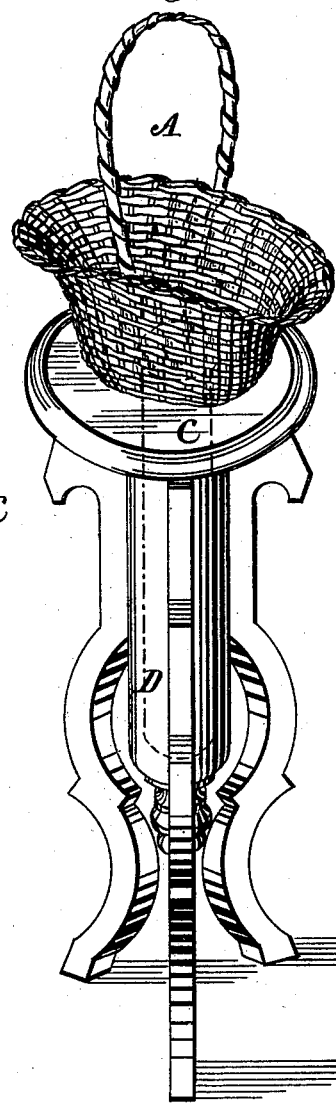
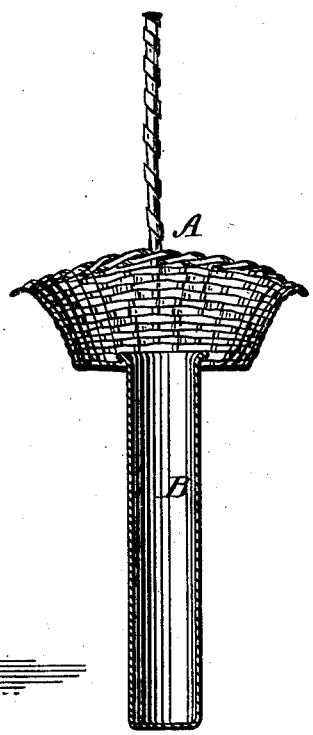
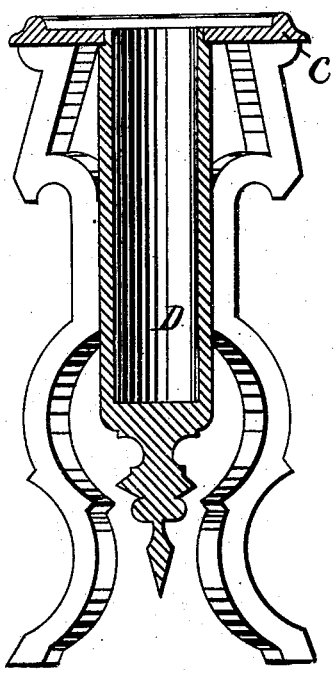
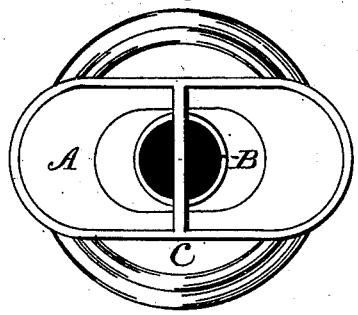
Witnesses:
Inventor,
Joseph Perkins
By Dewey & Co
Attorneys

UNITED STATES PATENT OFFICE.

JOSEPH PERKINS, OF SAN FRANCISCO, CALIFORNIA.

FLOWER HOLDER AND STAND.

SPECIFICATION forming part of Letters Patent No. 265,700, dated October 10, 1882.

Application filed July 25, 1882. (No model.)

*To all whom it may concern:*

Be it known that I, JOSEPH PERKINS, of the city and county of San Francisco, State of California, have invented an Improved Combined Flower Holder and Stand; and I hereby declare the following to be a full, clear, and exact description thereof.

My invention relates to a new and useful combined flower holder and stand; and it consists in a basket or other similar and usual receptacle for flowers, plants, &c., said receptacle being provided with a reservoir for water or earth, extending from its bottom; and in a stand or table provided with a central sheath to receive the reservoir of the basket and hide it from view.

The object of my invention is to furnish a flower or plant holder which, on account of the provision made for the presence of water or earth, is well adapted to keep the flowers or plants fresh and alive, and at the same time to hide the lower portion or reservoir, so that the whole device may bear the appearance of an ordinary flower-holder resting upon a stand.

Referring to the accompanying drawings, Figure 1 is a perspective view. Fig. 2 is a vertical section. Fig. 3 is a vertical section through basket and reservoir. Fig. 4 is a plan, looking down.

Let A represent a basket of any suitable form, having, as shown in Fig. 3, inserted through its bottom a reservoir or tube, B. The lower end of this reservoir is closed, and the upper end opens out into the basket, as seen in Fig. 4.

C represents any ornamental stand usually designed and found in parlors. From the center of its top extends downwardly a sheath, D, Fig. 2, adapted to receive the tube B. When the parts are put together, as shown in Fig. 1, the tube or reservoir B extends down into the sheath D, and the basket rests on the top of the stand. In this position nothing is seen of the reservoir, and the whole device seems simply a basket resting on a table. This makes a much neater appearance than if the reservoir were exposed, besides affording protection both to the tube and the basket, the latter of which is not liable to be thrown off from the stand. The receptacle here shown as a basket, A, may be any form of holder designed or suitable to contain flowers, plants, &c., and the reservoir may be made of any material.

In using the device, when flowers are placed in the basket, water may be poured over them or previously placed in the reservoir, and the stems may be extended into the water, thus receiving moisture to keep the flowers fresh.

Plants may be placed in the basket and their roots covered in earth, with which the reservoir may be filled, and by the addition of water at proper intervals, may be made to grow. Cuttings may likewise be rooted. The reservoir being hidden from view, a pleasant and agreeable surprise may be furnished, as nothing but the receptacle A will be seen.

Having thus described my invention, what I claim as new, and desire to secure by Letters Patent, is—

1. A basket or other receptacle having a reservoir attached to its bottom, and opening therefrom, in combination with a support or stand constructed to sustain the receptacle and conceal the reservoir from view, substantially as herein described.

2. The receptacle or basket A and reservoir or tube B, extending from its bottom, in combination with the support or stand C to support the basket and the sheath D to receive and hide the tube, substantially as herein described.

In witness whereof I hereunto set my hand.

JOS. PERKINS.

Witnesses:
A. MAYERS,
J. D. BLOOD.